(12) United States Patent
Hery

(10) Patent No.: US 7,918,973 B2
(45) Date of Patent: Apr. 5, 2011

(54) PROCESS FOR DISTILLING SOLID ORGANIC PRODUCTS

(75) Inventor: Jean-Sebastien Hery, Bordeaux (FR)

(73) Assignee: Thermya, Villenave d'Ornon (FR)

( * ) Notice: Subject to any disclaimer, the term of this patent is extended or adjusted under 35 U.S.C. 154(b) by 396 days.

(21) Appl. No.: 11/914,571

(22) PCT Filed: May 23, 2006

(86) PCT No.: PCT/FR2006/050471
§ 371 (c)(1),
(2), (4) Date: Nov. 16, 2007

(87) PCT Pub. No.: WO2007/000548
PCT Pub. Date: Jan. 4, 2007

(65) Prior Publication Data
US 2008/0210536 A1    Sep. 4, 2008

(30) Foreign Application Priority Data

May 23, 2005 (FR) ...................................... 0551335

(51) Int. Cl.
*C10B 53/02* (2006.01)
*C10J 3/00* (2006.01)
(52) U.S. Cl. .................... 201/30; 201/3; 201/8; 201/33; 202/122; 48/111; 48/209; 585/240; 585/242
(58) Field of Classification Search .................. 201/8, 3, 201/32, 33; 202/122; 110/230, 219, 224; 48/111, 209; 585/240, 242
See application file for complete search history.

(56) References Cited

U.S. PATENT DOCUMENTS

| 4,279,208 A | * | 7/1981 | Guillaume et al. | 110/346 |
| 4,688,521 A | * | 8/1987 | Korenberg | 122/4 D |
| 6,035,791 A | * | 3/2000 | Hery | 110/230 |

(Continued)

FOREIGN PATENT DOCUMENTS
WO    WO 96/38515 A    12/1996

OTHER PUBLICATIONS

"Low-Temperature pyrolysis of CCA-treated wood: thermogravimetric ananlysis", Helsen et al., Journal of Analytical and Applied Pyrolysis 52 (1999) 65-86.*

(Continued)

*Primary Examiner* — N. Bhat
(74) *Attorney, Agent, or Firm* — Heslin Rothenberg Farley & Mesiti P.C.

(57) ABSTRACT

A process for treating solid organic materials, especially for recycling treated wood, uses energy provided by hot gases at the bottom of a reactor column to perform a distillation operation which ensures splitting of organic bonds in the material and uses, as the distillation operation progresses, constant control between a first temperature of the hot gases before they are introduced into the lower part of the reactor column and a second temperature of a layer of the material located in an area immediately above the grid of the reactor column. When the first temperature and the second temperature are identical or virtually identical, corresponding to removal of all the organic bonds of the material by evaporation and transport by the hot gases from the bottom to the top of the column, the layer of material at the second temperature is removed in order to collect a material that largely consists of carbon and constitutes a secondary raw material.

19 Claims, 2 Drawing Sheets

U.S. PATENT DOCUMENTS 6,826,912 B2 * 12/2004 Levy et al. ...................... 60/750

OTHER PUBLICATIONS

International Search Report for PCT/FR2006/050471, dated Jan. 11, 2007.

J. Hery: "A Complete Industrial Process to Recycle CCA-Treated Wood" Environmental Impacts of Preservative-Treated Wood, XP002346050.

Helsen L et al: "Total Recycling of CCA Treated Wood Waste By Low-Temperature Pyrolysis" Waste Management, Elsevier, New York, NY, US. vol. 18, No. 6-8, Oct. 1998. XP004158825.

* cited by examiner

PROCESS FOR DISTILLING SOLID ORGANIC PRODUCTS

CROSS REFERENCE TO RELATED APPLICATIONS

This application is a national stage filing under section 371 of International Application No. PCT/FRO6/050471, filed on May 23, 2006, and published in French on Jan. 4, 2007, as WO 2007/000548 A2 and claims priority of French application No. 0551335 filed on May 23, 2005, the entire disclosure of these applications being hereby incorporated herein by reference.

BACKGROUND ART

The invention relates to the technical field of recycling solid organic materials, and more specifically to the recycling of contaminated wood waste, including wood waste treated with CCA (Copper, Chromium, Arsenic), preservatives used in particular for applications such as posts and telephone poles and also for the recycling of the other solid organic materials such as agricultural waste for example.

In the specific application of recycling contaminated wood waste, a process to recycle such wood waste has been developed within the framework of the Applicant's Patent EP 772663. This process referred to as "CHARTHERM" uses adiabatic combustion characterised by the following defined phases.

The treated wood waste is crushed before being introduced into a tall column-shaped tower reactor with a combustion area in its lower part and cooling zone in its upper part. In the lower part of the reactor, the crushed wood is subjected to an adiabatic combustion produced by hot gases having a low oxygen content and a temperature of the order of 400° C., the mass of crushed wood being located above the combustion area absorbing the excess heat carried by the gases, causing gradual cooling down of these gases to a temperature of less than 65° C., thereby creating an inverse temperature gradient and causing condensation which, when it comes into contact with the crushed wood, deposits all the particles, especially metallic particles, tar and steam, which the combustion gases may contain. The non-condensable combustion gases, cleaned of all heavy metals, are removed from the reactor. The oxygen content of the combustion gases introduced into the lower part of the reactor is extremely low in order to prevent ignition of the crushed wood and increase the reduction effect. The charcoal obtained after the adiabatic combustion of the crushed wood includes the reduction of heavy metals and other polluting elements with a view to subsequent recycling in other treatment applications.

The layout of the plant used to perform the "CHARTHERM" process is as follows:

The reactor comprises a column and includes the following items, from the bottom to the top of the column:
- a sealed ash hopper equipped with an ash removal system,
- a hot gas inlet located in the lower part of the reactor,
- a shaking grid making it possible to remove carbonised material and bring about a downward flow of crushed wood due to the effect of vibration,
- a gas cooling and filtering zone located above the combustion area,
- a sealed crushed wood feed inlet located in the upper part of the reactor,
- at the same level as the latter, a combustion gas outlet protected by a grid intended to prevent the ejection of crushed wood and some mechanisms ensuring uniform radial distribution of the crushed wood.

The actual process itself involves the following phases:
- feed crushed material into a column reactor;
- adiabatic combustion of said material in the lower part of the reactor resting on a shaking grid with cooling of gases in upper part of reactor;
- feed hot gases with low oxygen content into the lower part of reactor and transfer of gases through the reactor column with a gas recycling circuit incorporating a hot air generator, burner, compressor and an interposed device for scrubbing flue gases and recycled gases;
- remove treated material in the form of residues from the lower part of the reactor by controlling the shaking grid.

In practice, the process as described gives satisfactory operational results and produces at the end charcoal ash.

Nevertheless, the Applicant sought to further enhance this process with a quite precise objective, namely obtaining at the end of the process, reduced materials capable of constituting a (secondary) raw material, something which is totally impossible at present. The approach adopted by the Applicant was also intended to increase the usefulness of the plant used to perform the process, thus improving its productivity and profitability still further.

BRIEF SUMMARY OF INVENTION

According to a first aspect of the invention, the process for treating solid organic materials, especially for recycling treated wood, it's remarkable because it involves the following phases:
- a distillation process provoked by the energy carried out by the hot gases injected at the bottom of the column which effect is the breaking of the organic bonds inside materials.
- a continuous thermal control operation all along the distillation process where the temperature of the injected gases at the bottom of the column (T1) (170° C. to 370° C.) is compared with the temperature (T2) of the material laying just above the shaking grid.
- a removing operation of the lay of material laying just above the shaking grid by actuating the shaking grid when this lay of material reaches the same level of temperature than the temperature of injected gases at the bottom of the column (T1=T2) because this equality of temperatures means all the organics bonds have been evaporated and evacuated through the column from bottom to top pushed by the gas flow. All these allowing to collect at the bottom of the grid a product mostly made of carbon and being able to be considered as a (secondary) raw material.

These aspects and others will become apparent from the following description.

BRIEF DESCRIPTION OF THE DRAWING FIGURES

The object of the present invention is described, merely by way of example, in the accompanying drawings in which.

DETAILED DESCRIPTION

In order that the object of the present invention may more readily be understood, the following description is given, merely by way of example, reference being made to the accompanying drawings.

Figure 1:
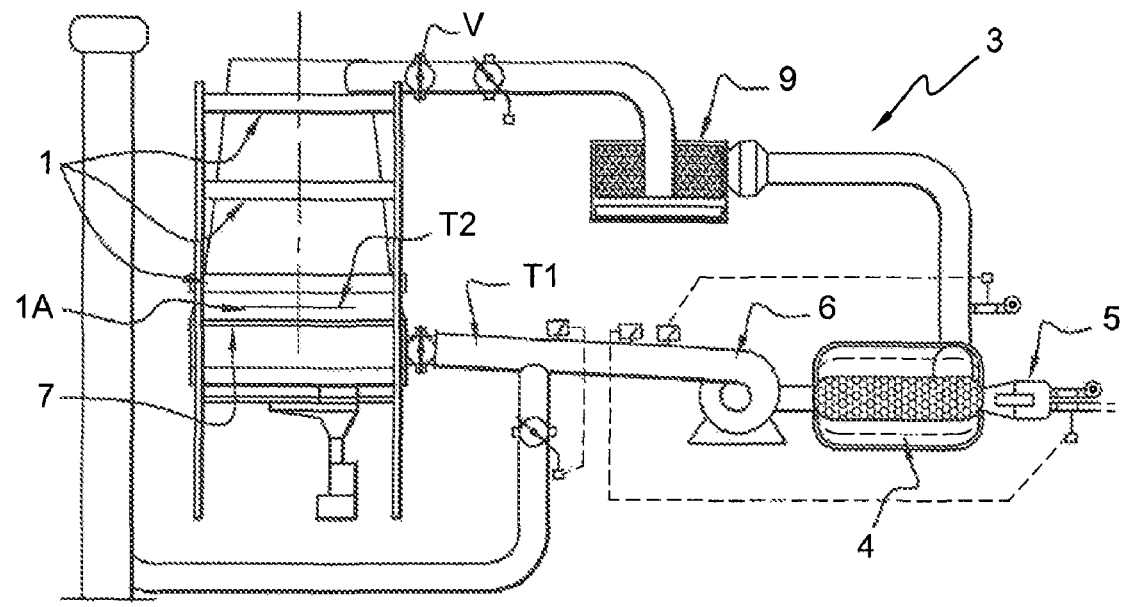
FIG. 1 is a view of the plant used to carry out the process according to the invention.
Figure 3:
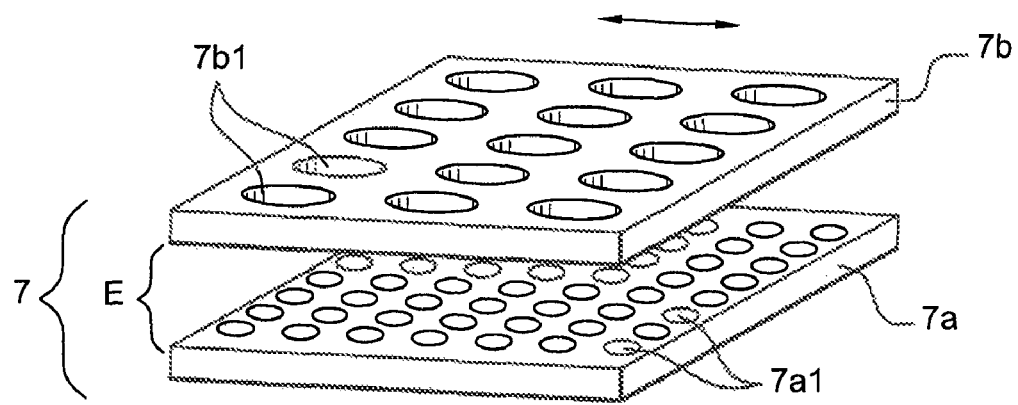
FIG. 3 is a schematic view of the grid.
Figure 2:
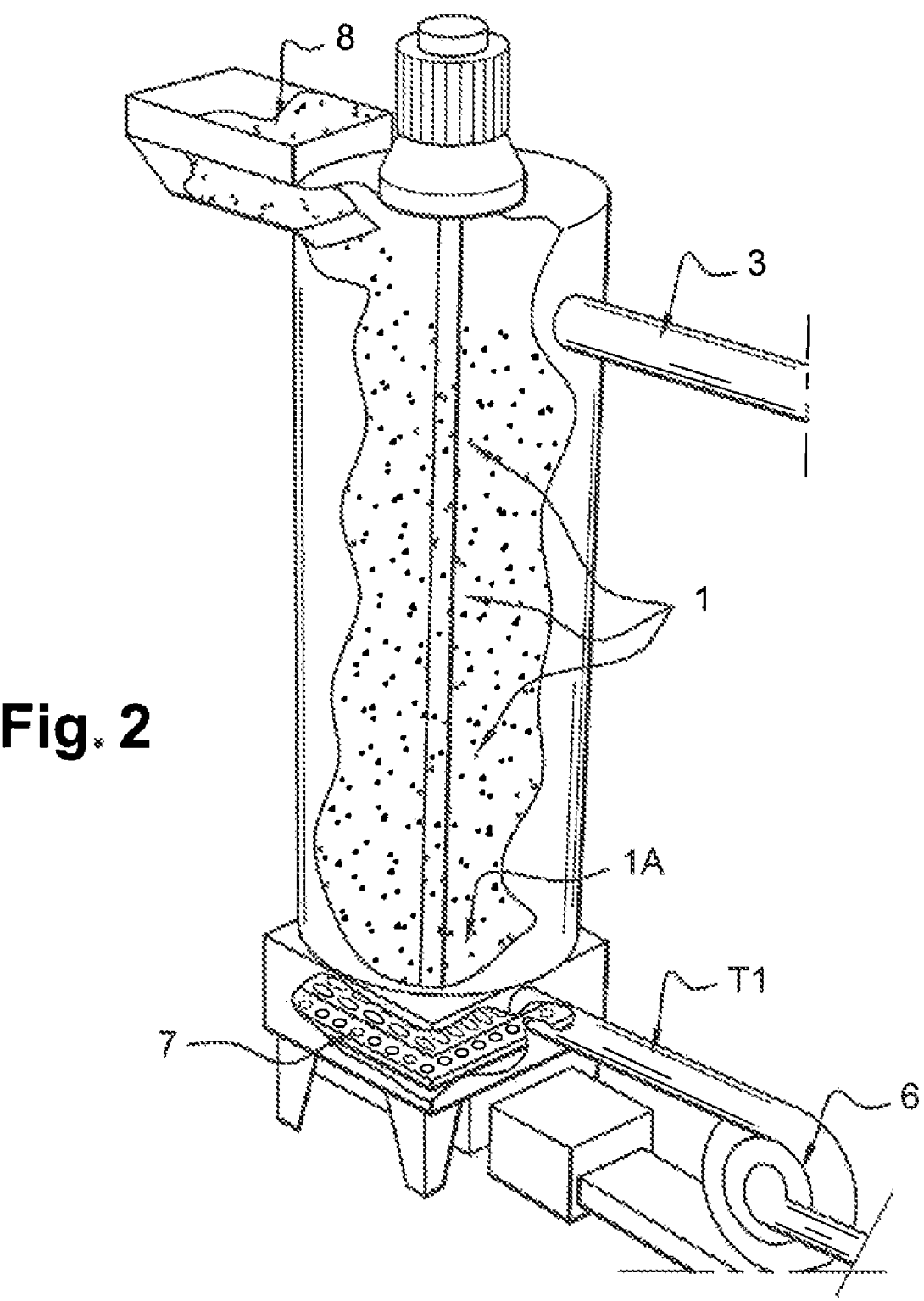
FIG. 2 is a cross-sectional view of the reactor column.

The installation, shown schematically in FIG. 1, comprises a reactor column in the form of a tall column (1) into the top of which previously crushed wood is introduced by means of a conveyor or equivalent device. By their very nature, this crushed wood naturally contain a high proportion of carbon and other minerals as well as, possibly, heavy metals resulting from treatments performed on the original products which may, for instance, be wooden posts used in telephone or electrical or other applications or railway sleepers or window jambs or other items. The reactor column (1) is therefore incorporated, as described in Patent EP 772663, in a hot gas emission and circulation circuit (3) that includes a hot gas generator (4), a burner (5), a supercharger (6) and an intermediate flue gas and recycled gas scrubber device (9). The base of the reactor column is designed with a grid (7) that moves horizontally, is located in the lower part of the reactor column and makes it possible, by means of an appropriate control, to remove the mass of specific materials as described later on below.

The crushed material introduced into the reactor column through hopper (8) lays on the above-mentioned grid due to the effect of gravity. The hot, low oxygen content gases are injected into the lower part (1A) of the reactor column and are forced into this column. The constriction of the gas exhaust at the top of the reactor column combined with the presence of the material inside the reactor cause a pressure dropt between the gas injection pressure at the bottom of the reactor column and the gas outlet pressure at the top of the column. This controlled pressure dropt provokes a stratified pressure decrease which, in the constant volume of the column, is accompanied by a temperature decrease from the bottom of the reactor column towards the top of the reactor column.

In comparison with the process described in Patent EP 772663, the gas injection temperature (T1) may be lower, varying from 170 to 370° C. depending on the type of material introduced into the column, in order to cause only splitting and evaporation of the organic components of this material which are then subsequently distilled, cooled and filtered, this temperature being, in every case, less than the temperature which provokes the adiabatic combustion in the original process.

In comparison with the process described in Patent EP 772663 which internally uses adiabatic combustion in order to obtain ash, the present invention uses a method intended to obtain a product which is most of it carbon and is capable of being considered as a (secondary) raw material thanks to the absence of combustion.

In practice, the process according to the invention differs from the prior art mentioned above in that it uses a distillation operation in which the energy provided by the hot gases at the bottom of the reactor column is used to fulfil a particular function, namely to break the organic bonds in the materials or crushed wood introduced into the reactor column.

Thus, the distillation process involves breaking the organic bonds in the crushed wood or others materials introduced into the reactor column by releasing the complex organic molecules which evaporate from it and are transported up towards the top of the reactor column by the flow of hot gases. Thus, the organic bonds gradually break in the material or crushed wood that is introduced into the reactor column. At the same time and in accordance with another important feature of the invention, the process uses, as the distillation operation progresses, continuous constant control by appropriate means of measurement and adjustment between the temperature (T1) of the hot gases before they are introduced into the lower part of the reactor column and the temperature (T2) of the materials or crushed wood located on the lay just above the grid of the reactor column. This gap is of the order of 5 cm.

Relative, continuous constant control between temperatures (T1-T2) makes it possible to identify the variation in the difference of temperature between the one of the material which varies and the one of the injected hot gases which is constant. When the two temperatures (T1) (T2) are identical or virtually identical, this suggests that energy is no longer being absorbed by breaking the organic bonds in the material or crushed wood and therefore that all the organic bonds of the material have been removed by evaporation and been transported from the bottom to the top of the reactor column by the hot gases.

The temperature (T2) of the material does not and must not exceed the temperature (T1) of the gases. Continuous constant monitoring of temperatures (T1-T2) is inherently part of monitoring the pressure dropt between the top and the bottom of the reactor column so that there is no heat at the top of the column, maximum heat exchange having to occur at the level of the grid so that the thermal shock is sudden and leaves only the mineral material. The difference of pressure between the bottom and the top of the column is controlled by means of a valve (V) fitted in the exhaust at the top of the reactor column. Thus, the more valve (V) is closed the more one increases the pressure in the lower part of the column, whilst allowing the flow of gas for recycling in order to cause the greatest possible pressure dropt and better stratification in the successive layers of materials that are present in the column.

That way, the layer (A) of material located in the reactor column which is just above and in contact with the grid is mineralised by evaporation of its organic components. The thickness of this layer is several centimeters and it is removed when it precisely meets the requirement that temperatures (T1) and (T2) be equal or virtually equal. In practice and on the basis of research and tests carried out, the mineral material obtained is essentially carbon based.

The process then involves removing this layer of mineral material, the organic part of it having being distilled, via the lower part of the column. The grid is moved horizontally and this causes opening of the holes that it contains and vertical removal of the material that rests on it. Thanks to this removal of mineral material, the mass of material located in the column drops downwards of a layer in a continuous cycle. A volume of fresh material equal to that of the material removed is then introduced into the upper part of the reactor column.

In addition, to optimise the process, the reactor column is conical and tapers upwards as shown in FIG. 1, thus avoiding arching of the charge and encouraging heat exchange and stratification. Optimising the process also results in a particular embodiment of grid (7). To achieve this, it must be, to a certain extent, "transparent" and have a minimal effect in terms of heat absorption and in terms of pressure dropt generation. To achieve this, the grid has two components (7a-7b), component (7a) located in the lower part of the column (1) being fixed and having a plurality of circular openings (7a1) in a multiple cluster configuration. Component (7b) being mobile relative to component (7a) and is located slightly raised above the latter by means of sliding wedges. Component (7b) has oblong holes (7b1) which therefore partially overlap the openings in the fixed component. Component (7b) has a thickness of roughly no more than 1 to 2 cm. The gap (E) between the two components (7a-7b) defines a fluidised gas bed. Layer (A) of material at temperature (T2) is therefore placed on component (7b). Backward and forward movement of component (7b) is ensured by any mechanical or other means in order to ensure movement making it possible to transfer layer (A) of mineral material through 7b and 7a down towards the bottom of the reactor column and remove it.

According to the invention, during the operating phases of the distillation process according to the invention, inside the column, the evaporated organic molecules are transported up towards the top of this column by the flow of hot gases. Therefore they are in contact with material at lower temperatures and the molecules recondense on a wall of material that is cooler. However, gradual, continuous removal of layers (A) of material, the temperature (T2) having reached that (T1) of the hot gases will result in a new phase in which the recondensed molecules are reheated with repeated fragmentation or breaking by evaporating them again.

However, the lighter, smaller organic molecules will rise up higher in the reactor column and evaporate. This therefore produces a continuous alternating cycle of phases during which the organic molecules are recondensed or reheated and fragmented. These will all be increasingly light and small and be removed from the top of the reactor column.

The lighter organic molecules located in the upper part of the reactor column are removed by the gases so that they can subsequently be recycled. In this second situation, said remaining smaller, lighter organic molecules are mostly combustible hydrocarbons.

The outlet gases from the reactor column are routed to a scrubbing and drying area of the plant and are then introduced back into the hot air generator with associated air. This makes it possible to burn all the remaining organic molecules obtained from the above-mentioned distillation process at high temperature. Incidentally, the recycling of gases charged with these resulting organic molecules makes it possible to supply the burner with light fuel obtained by distilling the original material, thereby allowing energy savings.

In the process described in above-mentioned previous Patent EP 772.663, the tube for reinjecting the gases charged with these residual molecules into the boiler is designed with openings that make it possible to feed in fresh air in just the right proportions to ensure that the gas from the outlet of the burner always contains little oxygen. The outlet gases from this hot gas generator, including the recycled gases, are introduced into the lower part of the reactor column.

The distillation process according to the invention thus described has numerous advantages compared to the original process. The hot and neutral gases provide thermal energy which releases the organic molecules from the original material introduced into the reactor column and monitoring the temperatures and pressures in the column makes it possible to obtain an optimum distillation effect. The successive phases during which the organic particles are repeatedly recondensed and reheated in the reactor column allow gradual, increasingly fine distillation of the molecules in order to obtain a mineral material. The latter comprises, depending on the particular material, 60 to 98% carbon compared to its total volume, 95 to 98% in the case of wood.

Another advantage of the process is the fact that, because the process temperature is much lower than the fusion temperature of carbon structures, the carbon of the mineral material retains the same natural crystalline structure as when it is formed as an organo-compound, i.e. a graphite type crystalline structure. The carbon of the mineral material is therefore friable.

An additional advantage of the process is the fact that any minerals other than carbon that are not anymore linked to the latter by organic molecular bonds tend, by losing their bonds, to group together and form agglomerates that are independent of the carbon structure.

Using this optimised version of the invention prevents any combustion of the kind described in Patent EP 772.663.

The combined advantages of the friability of the carbon of the mineral material and the phenomenon of agglomeration of the other minerals therefore make it possible to envisage using subsequent treatment of the mineral material in order to manufacturing clean carbon powder in accordance with another process developed by the Applicant.

Thus, according to the invention, the applications and performance of the distillation process extend far beyond those of the original process defined in EP 772663. The distillation process makes it possible to treat mineral materials with a view to upgrading and recovery in order to obtain the equivalent of a carbon raw material, something which it was not possible to accomplish previously.

The invention has many applications in the treatment of solid organic materials, recycling of treated wood and also, surprisingly, in the processing of agricultural waste or poultry droppings.

The invention claimed is:

1. A process for treating solid organic materials comprising:
   introduction of crushed material into a reactor column having a lower part and an upper part;
   injection of hot gases with low oxygen content having a temperature of 170° C. to 370° C. into the lower part of the reactor column to heat said material, said material laying on a grid that moves horizontally, wherein said material is cooler in an upper part of said reactor column;
   transfer of gases through the reactor column with an exhaust gas recycling circuit incorporating a hot gas generator, burner, supercharger and reinjection of recycled gases;
   continual monitoring and comparison of a first temperature of the hot gases before the gases are injected into the lower part of the reactor column and a second temperature of a layer of the material located in an area immediately above the grid of the reactor column; and
   collecting mineral material from the lower part of the reactor column by controlling the moving grid when said first temperature and said second temperature are identical or virtually identical;
   wherein the combination of oxygen content and temperature deters combustion and promotes distillation in the reactor column.

2. A process as claimed in claim 1, wherein the distillation takes place in a continuous, gradual, alternating cycle that includes phases in which organic molecules are recondensed or reheated and fragmented, said organic molecules becoming increasingly light and being removed from the top of the reactor column.

3. A process as claimed in claim 2, wherein the layer of material is mineralised by:
   a) evaporating organic components of the layer;
   b) transporting the evaporated organic molecules by the flow of hot gases towards the cooler, upper part of the column;
   c) recondensing the evaporated organic molecules;
   d) removing the layer of mineral material;
   e) adding new material into the reactor column.

4. A process according to claim 3, wherein exhaust gases from the reactor column are routed to a scrubbing and drying area.

5. The process according to claim 4, wherein said scrubbed and dried exhaust gases are reinjected into the exhaust gas recycling circuit.

6. A process as claimed in claim 1, further comprising employing a pressure monitoring and control valve located in an exhaust at the upper part of the reactor column.

7. A process as claimed in claim 1, wherein thickness of the layer of material is of the order of 5 cm.

8. A process as claimed in claim 1, applied for recycling of treated wood.

9. A process as claimed in claim 1, applied to treating of agricultural waste.

10. A process as claimed in claim 1, applied to treating of organic solids.

11. An apparatus for carrying out the process as claimed in claim 1, said apparatus comprising a reactor column that includes the following items from the bottom to the top of the column:
- a sealed space equipped with a mineral carbonated products removal system,
- a hot gas injection system located in the lower part of the reactor column,
- a two part grid comprising a lower fixed grid element and an upper moveable grid element to remove the mineral material and bring about a downward flow of the mineral material,
- a gas cooling and filtering zone,
- a sealed introduction system for crushed solid organic materials located in the upper part of the reactor column,
- at the same level as the upper part, a distillation gas exhaust system connected to a gas recycling circuit.

12. The apparatus of claim 11 further comprising one or more of:
   a) a pressure monitoring and control valve;
   b) a temperature monitoring and control system; and
   c) a fixed grid element configured to create a fluidized gas bed in a gap between said fixed grid element and said moveable grid element.

13. The apparatus of claim 12 wherein said pressure monitoring and control valve is located in the upper part of the column.

14. The apparatus of claim 12 wherein said pressure monitoring and control valve monitors a difference in pressure between gas injection and gas exhaust of the column and is able to control the rate of gas injection.

15. The apparatus of claim 12 wherein said pressure temperature monitoring and control system monitors a difference in temperature between the first temperature and the second temperature and is able to adjust the second temperature.

16. The apparatus of claim 11 wherein said grid comprises a fixed component in the lower part of the column and a mobile component located above the fixed component and superimposed so as to define a gap in the form of a fluidised gas bed, and wherein said components each having openings that are circular and oblong, respectively.

17. The apparatus of claim 11 wherein said column is tapered and reduces towards its top.

18. The process as claimed in claim 1, applied to treating poultry droppings.

19. The process of claim 1 wherein said mineral material is comprised of carbon in graphitic form.

* * * * *